(12) United States Patent
Kopietz (10) Patent No.: US 12,003,756 B2
(45) Date of Patent: *Jun. 4, 2024

(54) SYSTEMS AND METHODS FOR GAME-GENERATED MOTION VECTORS

(71) Applicant: ZeniMax Media Inc., Rockville, MD (US)

(72) Inventor: Michael Kopietz, Frankfurt (DE)

(73) Assignee: ZeniMax Media Inc., Rockville, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/955,665

(22) Filed: Sep. 29, 2022

(65) Prior Publication Data

US 2023/0089232 A1 Mar. 23, 2023

Related U.S. Application Data

(60) Continuation of application No. 16/736,490, filed on Jan. 7, 2020, now Pat. No. 11,503,326, which is a
(Continued)

(51) Int. Cl.
| | |
|---|---|
| *H04N 7/12* | (2006.01) |
| *E05B 77/54* | (2014.01) |
| *E05B 79/20* | (2014.01) |
| *E05B 83/24* | (2014.01) |
| *E05B 85/24* | (2014.01) |
| *E05B 85/26* | (2014.01) |

(Continued)

(52) U.S. Cl.
CPC .......... *H04N 19/517* (2014.11); *E05B 77/54* (2013.01); *E05B 79/20* (2013.01); *E05B 83/24* (2013.01);
(Continued)

(58) Field of Classification Search
CPC .... H04N 19/517; H04N 19/537; H04N 19/61; E05B 77/54; E05B 79/20; E05B 83/24;
(Continued)

(56) References Cited

U.S. PATENT DOCUMENTS

| | | | | |
|---|---|---|---|---|
| 5,778,190 A | * | 7/1998 | Agarwal | H04N 1/415 |
| | | | | 375/240.02 |
| 6,173,077 B1 | * | 1/2001 | Trew | H04N 19/51 |
| | | | | 375/E7.081 |

(Continued)

FOREIGN PATENT DOCUMENTS

| | | |
|---|---|---|
| CN | 102668495 A | 9/2012 |
| CN | 103716643 A | 4/2014 |

(Continued)

OTHER PUBLICATIONS

"Office Action Issued in Korean Patent Application No. 10-2021-7038338", dated Jun. 24, 2022, 11 Pages.
(Continued)

*Primary Examiner* — Gims S Philippe
(74) *Attorney, Agent, or Firm* — Klarquist Sparkman, LLP (57) ABSTRACT

Systems and methods for integrated graphics rendering are disclosed. In certain embodiments, the systems and methods utilize a graphics engine, a video encoding engine, and remote client coding engine to render graphics over a network. The systems and methods involve the generation of per-pixel motion vectors, which are converted to per-block motion vectors at the graphics engine. The graphics engine injects these per-block motion vectors into a video encoding engine, such that the video encoding engine may convert those vectors into encoded video data for transmission to the remote client coding engine.

20 Claims, 4 Drawing Sheets

Related U.S. Application Data continuation of application No. 16/290,468, filed on Mar. 1, 2019, now Pat. No. 10,701,388, which is a division of application No. 15/958,499, filed on Apr. 20, 2018, now Pat. No. 10,567,788.

(60) Provisional application No. 62/596,325, filed on Dec. 8, 2017, provisional application No. 62/488,526, filed on Apr. 21, 2017.

(51) Int. Cl.
| | |
|---|---|
| *G06T 9/00* | (2006.01) |
| *G06T 15/00* | (2011.01) |
| *H04N 19/517* | (2014.01) |
| *H04N 19/537* | (2014.01) |
| *H04N 19/61* | (2014.01) |
| *E05B 81/16* | (2014.01) |
| *F16H 59/10* | (2006.01) |
| *F16H 63/36* | (2006.01) |
| *H04N 19/527* | (2014.01) |
| *H04N 19/56* | (2014.01) |

(52) U.S. Cl.
CPC ............ *E05B 85/243* (2013.01); *E05B 85/26* (2013.01); *G06T 9/00* (2013.01); *G06T 15/005* (2013.01); *H04N 19/537* (2014.11); *H04N 19/61* (2014.11); *E05B 81/16* (2013.01); *F16H 59/10* (2013.01); *F16H 63/36* (2013.01); *H04N 19/527* (2014.11); *H04N 19/56* (2014.11)

(58) Field of Classification Search
CPC ......... E05B 85/243; E05B 85/26; G06T 9/00; G06T 15/005
See application file for complete search history.

(56) References Cited

U.S. PATENT DOCUMENTS

| | | | | |
|---|---|---|---|---|
| 6,687,405 | B1 * | 2/2004 | Trew | ........................ G06T 9/20 |
| | | | | 382/233 |
| 10,567,788 | B2 | 2/2020 | Kopietz | |
| 10,701,388 | B2 | 6/2020 | Kopietz | |
| 11,381,835 | B2 | 7/2022 | Kopietz | |
| 11,503,326 | B2 | 11/2022 | Kopietz | |
| 2005/0094729 | A1 | 5/2005 | Yuan | |
| 2011/0206124 | A1 * | 8/2011 | Morphet | ................ H04N 5/145 |
| | | | | 375/E7.123 |
| 2012/0081612 | A1 * | 4/2012 | Segall | .................... G06T 5/002 |
| | | | | 348/607 |
| 2013/0083161 | A1 | 4/2013 | Hsu et al. | |
| 2014/0348238 | A1 * | 11/2014 | Morphet | ................ H04N 19/51 |
| | | | | 375/240.16 |
| 2016/0133221 | A1 * | 5/2016 | Peana | ..................... G09G 5/10 |
| | | | | 345/212 |

FOREIGN PATENT DOCUMENTS

| | | |
|---|---|---|
| KR | 20080052344 A | 6/2008 |
| KR | 20150070848 A | 6/2015 |

OTHER PUBLICATIONS

"Notice of Allowance Issued in Korean Patent Application No. 10-2022-7028903", dated Oct. 10, 2023, 8 Pages.

"Notice of Allowance Issued in Taiwan Patent Application No. 110103931", dated Jan. 7, 2023, 4 Pages.

"Office Action Issued in Canadian Patent Application No. 3059740", dated Jan. 27, 2023, 3 Pages.

"Office Action Issued in Korean Patent Application No. 10-2022-7028903", dated Apr. 5, 2023, 20 Pages.

"Office Action and Search Report Issued in China Patent Application No. 201880040171.3", dated May 1, 2023, 16 Pages.

Cheng, et al., "Real-time 3D graphics streaming using MPEG-4," School of Information and Computer Science University of California, Irvine, CA 92697, Jul. 18, 2004, pp. 1-16.

Communication pursuant to article 94(3) EPC, Received for European Application No. 18788077.8, mailed on Mar. 1, 2024, 06 pages.

Office Action Received for Chinese Application No. 201880040171.3, mailed on Mar. 20, 2024, 11 pages (English Translation Provided).

\* cited by examiner

SYSTEMS AND METHODS FOR GAME-GENERATED MOTION VECTORS

RELATED APPLICATIONS

This application is a continuation of U.S. patent application Ser. No. 16/736,490, filed Jan. 7, 2020, which is a continuation of U.S. patent application Ser. No. 16/290,468, filed Mar. 1, 2019, which is a divisional of U.S. patent application Ser. No. 15/958,499, filed Apr. 20, 2018, the disclosure of which is hereby incorporated by reference. U.S. patent application Ser. No. 15/958,499 claims the benefit of U.S. Provisional Application No. 62/488,526, filed Apr. 21, 2017, the disclosure of which is hereby incorporated by reference. U.S. patent application Ser. No. 15/958,499 also claims the benefit of U.S. Provisional Application No. 62/596,325, filed Dec. 8, 2017, the disclosure of which is hereby incorporated by reference.

BACKGROUND OF THE INVENTION

Remote gaming applications, in which a server-side game is controlled by a client-side player, have attempted to encode the video output from a three-dimensional (3D) graphics engine in real-time using existing or customized encoders. However, the interactive nature of video games, particularly the player feedback loop between video output and player input, makes game video streaming much more sensitive to latency than traditional video streaming. Existing video coding methods can trade computational power, and little else, for reductions in encoding time. New methods for integrating the encoding process into the video rendering process can provide significant reductions in encoding time while also reducing computational power, improving the quality of the encoded video, and retaining the original bitstream data format to preserve interoperability of existing hardware devices.

Existing video coding standards have only color and temporal information contained in image sequences to improve video encoding time, size, or quality. Some coding standards, such as those in the MPEG standard series, use a computationally intensive block-based motion estimation method to approximate object movement based on the color data contained in a video. These block-based motion estimation methods have historically provided significant reductions in the size of encoded video, but are a source of significant latency in real-time video streaming environments.

Integrating the encoding process into the video rendering process provides access to additional data sources that can be leveraged for encoding improvements. For instance, some 3D graphics engines, such as those contained in a game engine, may already generate motion vectors that perfectly describe the movement of each pixel on each video frame. By providing both the final rendered frame and injecting properly formatted motion vector data into the encoder, the most computationally-complex and time-consuming step in the video encoder, motion estimation, can be skipped for each inter frame. Additionally, the motion vectors supplied by the graphics engine will be more accurate than those approximated by a block-based motion estimation algorithm, which will improve the quality of the encoded video.

These two domains, video encoding and real-time graphics rendering, have traditionally operated separately and independently. By integrating the graphics engine and encoder to leverage the strengths of each, the encoding time can be reduced enough to support streaming applications that are hyper-sensitive to latency.

These and other attendant advantages of the invention will become apparent in view of the deficiencies in the technologies described below.

For example, U.S. Patent Application Publication No. 2015/0228106 A1 ("the '106 Publication") discloses technology directed to decoding video data to generate a sequence of decoded blocks of a video image. The technology allows for the use of each decoded block of a video image as a separate texture for corresponding polygons of the geometric surface as the decoded block is generated by the codec engine. The '106 Publication technology describes integration between a codec engine that decodes encoded video data to generate the video image to be mapped and a 3D graphics engine that renders the display picture in part by performing the texture mapping of the video image to the geometric surface. However, this technology is deficient compared to the present invention at least because it does not disclose nor use a graphics engine that provides both the final rendered frame and properly formatted motion vector data for injection into the video codec engine, such that the video codec engine does not need to perform any motion estimation prior to transmitting encoded video data to the remote client coding engine. By contrast, the present invention's improvement to computer technology provides reductions in encoding time and computational power, improvement in the quality of the encoded video, and results the retention of the original bitstream data format in order to preserve interoperability.

U.S. Patent Application Publication No. 2011/0261885 A1 ("the '885 Publication"), discloses systems and methods directed to bandwidth reduction through the integration of motion estimation and macroblock encoding. In this system, the motion estimation may be performed using fetched video data to generate motion estimation related information, including motion vectors. These motion vectors may correspond to a current macroblock, using corresponding video data cached in the buffer. Again, the '885 Publication technology is deficient compared to the present invention at least because it does not disclose nor use a graphics engine that provides both the final rendered frame and properly formatted motion vector data for injection into the video codec engine, such that the video codec engine does not need to perform any motion estimation prior to transmitting encoded video data to the remote client coding engine. As such, the technology of the '885 Publication does not provide the same reductions in encoding time and computational power, and the improvement in the quality of the encoded video that the present invention offers.

As is apparent from the above discussion of the state of art in this technology, there is a need in the art for an improvement to the present computer technology related to video encoding in game environments.

SUMMARY OF THE INVENTION

It is therefore an object of the exemplary embodiments disclosed herein to address disadvantages in the art and provide systems and methods for graphics generation that use networked server architecture running a graphics engine, a video codec engine and a remote client coding engine to transmit encoded video data, whereby the graphics engine provides both the final rendered frame and properly formatted motion vector data for injecting into the video codec engine.

It is another object of the invention to provide systems and methods for graphics generation in which the video codec engine does not need to perform any motion estimation prior to transmitting encoded video data to the remote client coding engine.

It is yet another object of the invention to provide systems and methods for graphics generation in which the graphics engine converts per-pixel motion vectors into per-block motion vectors.

It is yet another object of the invention to provide systems and methods for graphics generation in which the per-pixel motion vectors are generated by using a compute shader to add the per-pixel motion vectors to camera velocity to obtain a per-pixel result, and in which the per-pixel result is stored in a motion vector buffer.

It is yet another object of the invention to provide systems and methods for graphics generation in which the per-block motion vector data is injected by the graphics engine into the video encoding engine in real-time, concurrently with a chroma subsampled video frame.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

In describing the preferred embodiments of the invention illustrated in the drawings, specific terminology will be resorted to for the sake of clarity. However, the invention is not intended to be limited to the specific terms so selected, and it is to be understood that each specific term includes all technical equivalents that operate in a similar manner to accomplish a similar purpose. Several preferred embodiments of the invention are described for illustrative purposes, it being understood that the invention may be embodied in other forms not specifically shown in the drawings.

In applications where a 3D graphics engine is rendering video to be encoded and transmitted in real-time, the graphics engine and encoder can be more tightly coupled to reduce the total computation time and computational overhead. Per-pixel motion vector data that is already generated by the graphics engine for each video frame can be converted to per-block motion vector data and injected into the codec engine to circumvent the motion estimation step which is the single most complex and computationally-intensive step in the encoding process. In graphics engines that use the reconstruction filter for plausible motion blur method, per-pixel motion vectors may already be calculated for each video frame. The conversion from per-pixel motion vectors to per-block motion vectors can be performed by finding the mean vector for each macroblock of 16×16 pixels. The conversion is performed in the 3D graphics engine so that only a small fraction of the original motion vector data needs to be passed from the 3D graphics engine to the coding engine. In cases where the graphics engine and coding engine do not share memory, this will also help reduce memory bandwidth consumption. The per-block motion vectors are injected into the codec engine, skipping the motion estimation step entirely, without significantly modifying the rest of the encoding process.

FIGS. 1-4 illustrate an example technique for the improvement of video encoding in video streaming applications where a 3D graphics engine generates accompanying motion vector data in the process of rendering a video frame.

Figure 1:
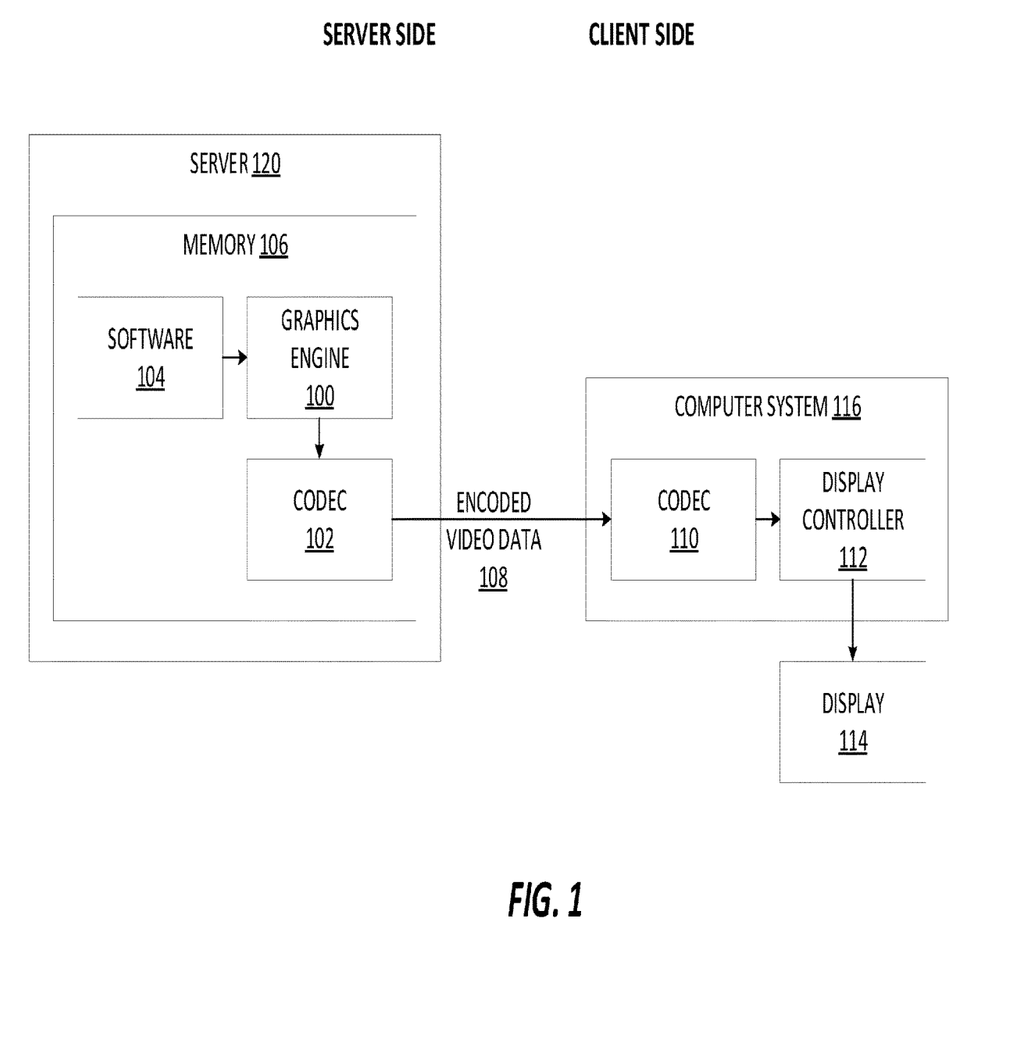
FIG. 1 is a block diagram illustrating a 3D graphics engine rendering a video for encoding and transmission to a client.

FIG. 1 illustrates an example system in which video is rendered and encoded for transmission to a remote client 116. A 3D graphics engine 100, running in memory 106 on some server architecture 120, passes video and supplemental motion vector information about a rendered video frame to a codec engine (referred to herein as codec or encoder) 102 which generates an encoded bitstream 108 for transmission to a client computer system 116. The server architecture 120 is any combination of hardware or software which can support the functions of both a graphics engine and a codec engine. In the given example, the graphics engine 100 may be implemented as, for example, a GPU executing video game software 104 loaded into some computer readable memory 106, while the codec engine 102 may be implemented as a CPU running video encoding software. The coding engine 102 generates encoded video data 108 for transmission to some remote client computer system 116, which includes a remote coding engine (codec) 110, which decodes the bitstream for playback on a display 114 driven by a display controller 112. The remote client computer system 116 is any combination of hardware, device, or software which enables the decoding and display of the encoded bitstream 108.

Figure 2:
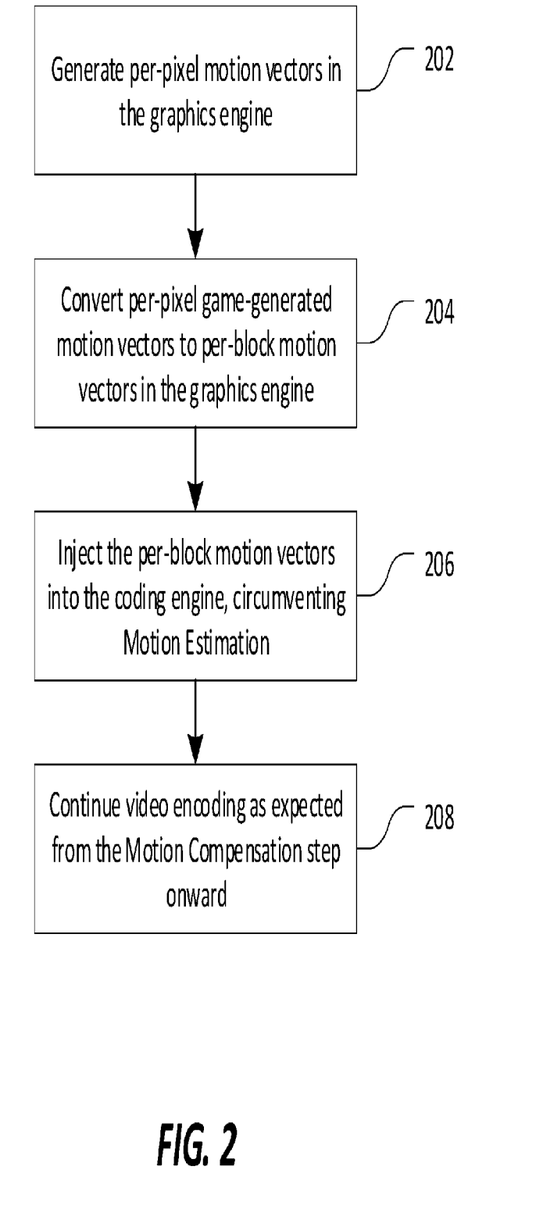
FIG. 2 is a flow diagram illustrating the steps required for latency reduction by injection of motion vectors generated by the 3D graphics engine into the modified encoding process of FIG. 4.

FIG. 2 illustrates the steps required to achieve faster encoding times by reusing existing supplemental data from the rendering process in the video encoding process. In step 202, the supplemental data must first be generated as a normal operational feature of the graphics engine 100 located at a server 120. As GPUs have become more powerful and ubiquitous, real-time per-pixel motion vector generation has become a common feature in modern video game engines. During the rendering of a 2D video frame from a 3D scene, a 3D graphics engine will generate ancillary outputs during the color generation process to be used as inputs for later post-process passes. The ancillary outputs may include information written to the accumulation, color, or velocity buffers, three memory locations allocated for the temporary storage of information about pixel depth, pixel color, and pixel movement respectively.

In a commonly used implementation of motion blur, referred to as the reconstruction filter for plausible motion blur, the per-pixel velocities from the velocity buffer are first down sampled into a smaller number of tiles, where each tile assumes the max velocity from the pixel group. The tiles are then masked using the per-pixel depths in the accumulation buffer and the results applied to the per-pixel colors in the color buffer to generate motion blur. There are several variations on the reconstruction filter method which improve fidelity, performance, or both, but the concepts remain similar and a velocity buffer contains the per-pixel motion between two adjacent frames. Although 'velocity' is the term used in graphics engine terminology and 'motion vector' is the term used in video encoding terminology, the terms are functionally equivalent and a per-pixel velocity is the same thing as a per-pixel motion vector. The velocity buffer contains the supplemental data, in the form of per-pixel motion vectors, which will be reused in the video encoding process.

In step 204, the graphics engine 100 located at the server 120 converts the per-pixel motion vectors to per-block motion vectors based on the macroblock size to be used in encoding. The H.264 codec uses 16×16 pixel macroblocks by default and has the option to sub-divide further. The 256 per-pixel motion vectors can be averaged together to provide a single mean vector that will serve as the per-block motion vector. This process is described in further detail in connection with FIG. 3.

In step 206, the per-macroblock motion vector information is injected into the coding engine/encoder 102 located at the server 120, bypassing the motion estimation step. In software implementations of the encoder, the motion estimation step can be completely disabled, which provides a significant savings in CPU computation time. The time savings in the CPU should more than offset the additional time required to calculate the average vectors in the GPU (in step 204) and transfer them to the CPU.

Figure 4:
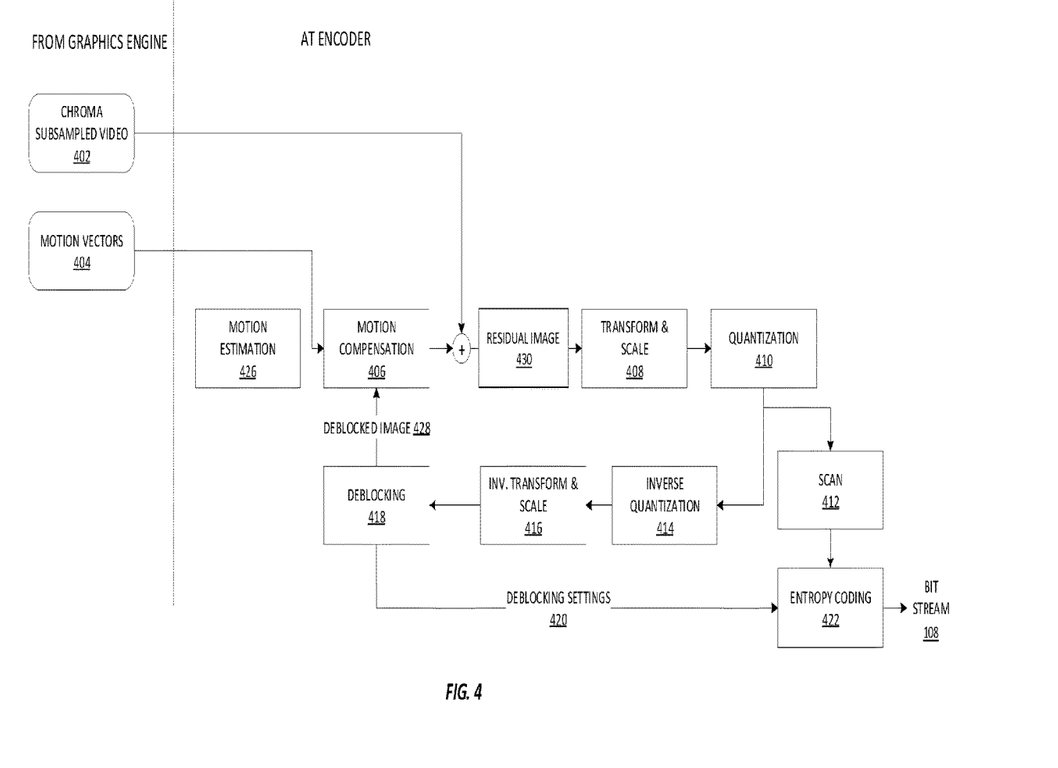
FIG. 4 is a flow diagram illustrating the required alterations to a video encoding process used in FIG. 1.

In step 208, because the per-block motion vectors supplied by the graphics engine 100 are interchangeable with those calculated in a typical motion estimation step, encoding begins from the motion compensation step onward (step 208). The rest of the video encoding process, as described in further detail in connection with FIG. 4, is not appreciably different from the typical motion compensation, residual calculation, and encoding steps performed by an encoding standard that uses motion estimation techniques.

Figure 3:
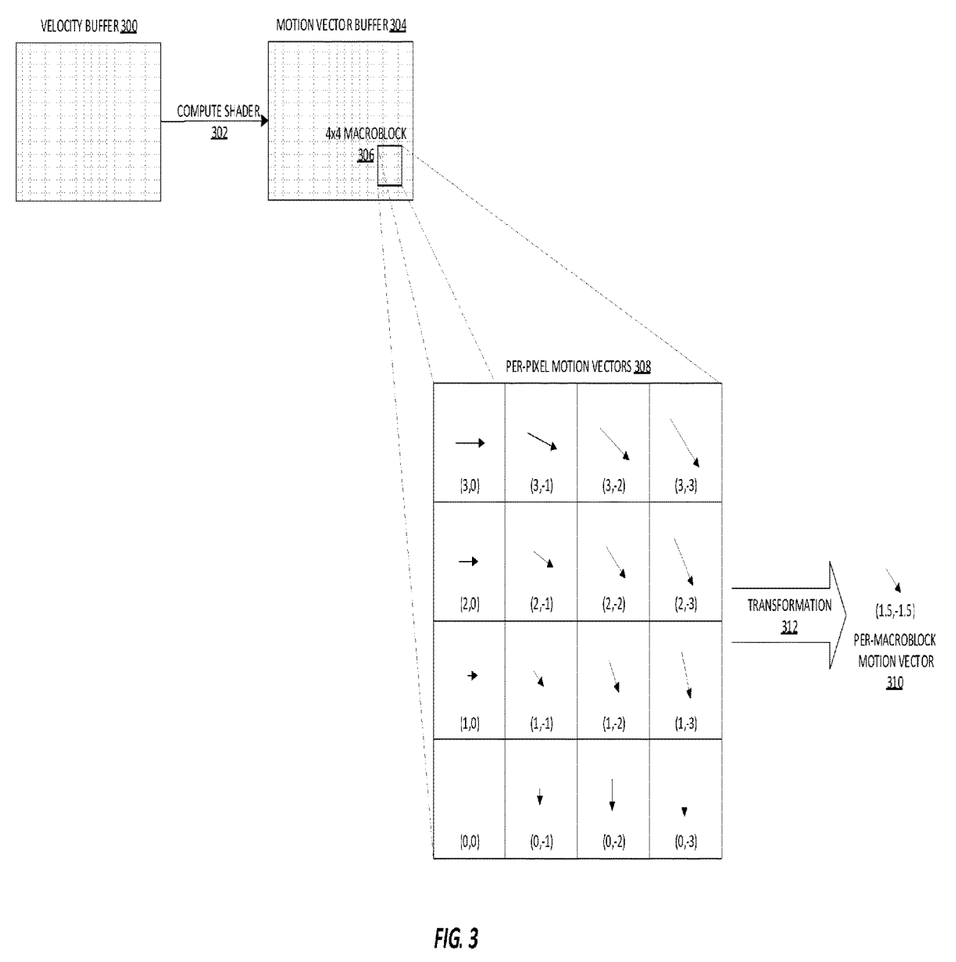
FIG. 3 is a diagram illustrating the transformation of per-pixel motion vectors generated in the graphics engine into per-macroblock motion vectors for injection into the encoding engine.

FIG. 3 illustrates in further detail the transformation, occurring in the graphics engine 100, from per-pixel motion vectors to per-macroblock motion vectors. During the color generation phase, a 3D graphics engine 100 located at a server 120 will generate per-pixel motion vectors and store the data in the velocity buffer 300 also located at the server 120. The velocity buffer 300 may contain data only for dynamic objects, excluding the motion information imparted by the player-camera movement. To get motion vector information for each pixel in the image space, a compute shader 302 will combine the vectors in the velocity buffer 300 with the camera velocity for all static objects not already included in the velocity buffer and store the per-pixel result in the motion vector buffer 304. The camera velocity is the 2D projection of the rotational and translational camera movement during the frame. Specific graphics engines may use slightly different methods to calculate these per-pixel motion vectors for the entire screen space, but the concepts remain the same.

The H.264 encoder uses a default macroblock size of 16×16, but can be subdivided into smaller sizes down to 4×4. In the FIG. 3 example, a 4×4 macroblock 306 is used as a simplified case but the method should be extrapolated to match the macroblock size used in the encoder. For a 4×4 macroblock 306 there are 16 per-pixel motion vectors 308 stored in the motion vector buffer 304. These per-pixel motion vectors 308 need to be transformed 312 into a single per-macroblock motion vector 310 that can be injected into the encoder for use in motion compensation as shown in FIG. 4. The arithmetic mean of the set of per-pixel vectors 308 is a transformation 312 method with a low computational-complexity and short compute time.

Optional modifications can be made to the arithmetic mean transformation 312 to improve quality at the cost of additional computational complexity or power. For instance, vector median filtering techniques can be applied to remove discontinuities in the macroblock's vector field before the arithmetic mean computation to ensure that the per-macroblock motion vector 310 is representative of most pixels in the macroblock 306. Because the resultant per-macroblock motion vector is derived from pixel-perfect motion vectors that were originally computed based on known object-movement data, these per-macroblock motion vectors will always be a more accurate representation than those calculated by existing block-based motion estimation algorithms that can only derive movement based on pixel color data.

FIG. 4 illustrates a method for skipping the computationally-complex motion estimation process by injecting motion vectors generated in the graphics engine 100 of the server 120 of FIG. 1 into the coding engine 102 of the server 120 FIG. 1. As explained in detail below, the resulting bit stream of encoded video data 108 is transmitted to the remote client computer system 116. The method shown in FIG. 4 illustrates the encoding process for a single inter-frame, specifically a P-frame as defined by the MPEG family of video codec standards. Intra frame (I-frame) generation will not be altered since motion compensation 406 is not performed in I-frame generation. The chroma subsampled video frame 402 and per-block motion vector data 404 will be transferred from the graphics engine 100 as soon as they are available. The game-generated motion vectors 404 are used to circumvent the motion vector generation that would otherwise occur in a typical motion estimation 426 step, as outlined in the H.264/MPEG-4 AVC standard. The motion estimation 426 step will be skipped, and can be disabled in a software implementation of the coding engine. Skipping the block-based motion estimation 426 step will provide a significant reduction in encoding time, which will more than offset the time taken to convert the velocity buffer data into the appropriate format as described in connection with FIG. 3.

The motion vectors 404, having already been converted for the appropriate macroblock size, can be used immediately without any alteration to the motion compensation 406. The results of the motion compensation 406 are combined with the input chroma subsampled video frame 402 to form the residual image 430, which is processed by the residual transformation & scaling 408, quantization 410, and scanning 412 steps that typically occur within existing hardware or software video encoders.

The deblocking steps must be performed if the implementation's chosen decoding standard demands it. The deblocking settings 420 and deblocked image 428 are calculated by applying the coding standard's algorithms for inverse quantization 414, inverse transform & scale 416, then deblocking 418. The scanned coefficients 412 are combined with the deblocking settings 420 and encoded in the entropy coder 422 before being transmitted as a bit stream 108 to the remote client computer system 116 for decoding at the remote client computer system's codec 110. The deblocked image 428 becomes the input for the motion compensation 406 of the next frame. The bit stream (comprising encoded video data) 108 retains the same format as defined by the encoding standard used in the implementation such as H.264/MPEG-4 AVC. This example is specific to the H.264/MPEG-4 AVC standard, can be generally used for similar coding standards that use motion estimation 426 and motion compensation 406 techniques.

Example 1: Benchmark Testing Demonstrating Reductions in Encoding Time

The motion estimation step in traditional H.264 compliant encoding is typically the most computationally-complex and time-consuming step. As discussed herein, reusing game-generated motion vectors can produce significant reductions in encoding time.

In the test environment, the graphics engine produced output at a resolution of 1280×720 at 60 frames per second. The encoding times were captured from an x264 encoder running single-threaded. Running the encoder single-threaded will produce encoding times longer than real-world usage but will normalize measurements to one core so they are directly comparable to each other. Encoding times were first measured using unmodified motion estimation within the encoder, then remeasured in the same environment using the game-generated motion estimation feature enabled.

A low motion area was selected comprising of a first-person player view of the player's hands, weapon, and a stationary wall. The player's hands and weapons cycle through a slight "bobbing" animation to produce a small amount of pixel motion in a relatively small amount of screenspace. The results of this test are reproduced in Table I below, which shows latency results with and without the game-generated motion estimation techniques described herein. At a low intensity, with the game-generated motion estimation disabled, the unmodified encoding time was 12 ms. When the game-generated motion estimation was enabled, the encoding time was reduced by 3 ms to an encoding time of 9 ms. Similar latency reductions were shown for average and high motion intensity scenarios, with decreases in latency of 17.6% for average motion intensity scenarios and between 15% to 30% latency reductions in high latency scenarios. These results demonstrate a notably significant reduction in latency when the game-generated motion estimation is enabled.

TABLE 1

Latency Results at Varying Motion Intensities

| Motion Intensity | x264 Motion Estimation | Game Generated Motion Estimation | % Change |
|---|---|---|---|
| Low | 12 ms | 9 ms | 25% |
| Average | 17 ms | 14 ms | 17.6% |
| High | 20 ms-27 ms | 17 ms-19 ms | 15%-30% |

The test environment also revealed that there is an additional cost when converting the game-generated per-pixel motion vectors into per-macroblock motion vectors for the encoder. However, this cost is significantly less than the encoding time reductions described in the previous section. With the graphics engine producing video at a resolution of 1280×720, the motion vector transformation from per-pixel to per-macroblock took 0.02 ms. The measured encoder time savings are three orders of magnitude larger than the added cost of using game-generated motion vectors for encoding.

The foregoing description and drawings should be considered as illustrative only of the principles of the invention. The invention is not intended to be limited by the preferred embodiment and may be implemented in a variety of ways that will be clear to one of ordinary skill in the art. Numerous applications of the invention will readily occur to those skilled in the art. Therefore, it is not desired to limit the invention to the specific examples disclosed or the exact construction and operation shown and described. Rather, all suitable modifications and equivalents may be resorted to, falling within the scope of the invention.

The invention claimed is:

1. A computer-implemented method for encoding video in a system comprising a graphics engine and a video encoder, the method comprising:
   receiving, at the video encoder, motion information from the graphics engine;
   receiving, at the video encoder, a video frame to be encoded; and
   with the video encoder, encoding the video frame, thereby producing encoded video data, wherein the encoding the video frame includes:
      responsive to the receiving the motion information from the graphics engine, skipping at least some operations of motion estimation by using the motion information from the graphics engine to determine one or more per-block motion vectors for one or more blocks of the video frame, thereby reducing encoding time for the one or more blocks of the video frame;
      using the one or more per-block motion vectors in motion compensation for the one or more blocks of the video frame; and
      outputting, in a bitstream, the encoded video data.

2. The method of claim 1, wherein each of the one or more per-block motion vectors indicates motion for a macroblock of the video frame.

3. The method of claim 1, wherein each of the one or more per-block motion vectors indicates motion for a 4×4 block of the video frame.

4. The method of claim 1, wherein the motion information includes the one or more per-block motion vectors, the method further comprising:
   with the graphics engine, generating the one or more per-block motion vectors based on information generated by the graphics engine for a game.

5. The method of claim 4, wherein the generating the one or more per-block motion vectors comprises:
   with the graphics engine, converting per-pixel motion vectors into the one or more per-block motion vectors.

6. The method of claim 5, further comprising:
   at the graphics engine, before the converting, storing one or more motion vectors for dynamic objects in a velocity buffer; and
   with the graphics engine, combining the one or more motion vectors for dynamic objects with camera velocity information to generate the per-pixel motion vectors.

7. The method of claim 5, further comprising:
   with the graphics engine, before the converting, generating the per-pixel motion vectors from known object-movement data.

8. The method of claim 5, wherein the converting includes performing median filtering on the per-pixel motion vectors.

9. The method of claim 5, wherein the converting includes performing an arithmetic mean transformation on the per-pixel motion vectors.

10. The method of claim 1, wherein the reducing the encoding time due to the motion estimation for the one or more blocks of the video frame includes bypassing the motion estimation for the one or more blocks of the video frame.

11. A graphics generation system comprising a graphics engine and a video encoder, wherein the video encoder is configured to perform operations comprising:
   receiving motion information from the graphics engine;

receiving a video frame to be encoded; and
encoding the video frame, thereby producing encoded video data, wherein the encoding the video frame includes:
skipping at least some operations of motion estimation by using the motion information from the graphics engine to determine one or more per-block motion vectors for one or more blocks of the video frame, thereby reducing encoding time due to motion estimation for the one or more blocks of the video frame;
using the one or more per-block motion vectors in motion compensation for the one or more blocks of the video frame; and
outputting, in a bitstream, the encoded video data.

12. The system of claim 11, wherein each of the one or more per-block motion vectors indicates motion for a macroblock or a 4×4 block of the video frame.

13. The system of claim 11, wherein the motion information includes the one or more per-block motion vectors, and wherein the graphics engine is configured to generate the one or more per-block motion vectors based on information generated by the graphics engine for a game.

14. The system of claim 13, wherein the graphics engine is configured to generate the one or more per-block motion vectors by converting per-pixel motion vectors into the one or more per-block motion vectors.

15. The system of claim 11, wherein the reducing the encoding time due to the motion estimation for the one or more blocks of the video frame includes bypassing the motion estimation for the one or more blocks of the video frame.

16. One or more non-transitory computer-readable media having stored thereon computer-executable instructions for causing a computer system, when programmed thereby, to perform operations, the computer system comprising a graphics engine and a video encoder, the operations comprising:
with the graphics engine, generating per-pixel motion vectors;
with the graphics engine, converting the per-pixel motion vectors into one or more per-block motion vectors;
providing the one or more per-block motion vectors from the graphics engine to the video encoder for use in encoding a video frame, thereby producing encoded video data, wherein the encoding the video frame includes:
responsive to receiving the one or more per-block motion vectors from the graphics engine, skipping at least some operations of motion estimation, thereby reducing encoding time for one or more blocks of the video frame; and
using the one or more per-block motion vectors in motion compensation for the one or more blocks of the video frame.

17. The one or more computer-readable media of claim 16, wherein the operations further comprise:
at the graphics engine, before the converting, storing one or more motion vectors for dynamic objects in a velocity buffer; and
with the graphics engine, combining the one or more motion vectors for dynamic objects with camera velocity information as part of the generating the per-pixel motion vectors.

18. The one or more computer-readable media of claim 16, wherein the generating the per-pixel motion vectors uses known object-movement data.

19. The one or more computer-readable media of claim 16, wherein the converting includes performing median filtering on the per-pixel motion vectors.

20. The one or more computer-readable media of claim 16, wherein the converting includes performing an arithmetic mean transformation on the per-pixel motion vectors.

* * * * *